(12) United States Patent
Mascadri

(10) Patent No.: US 6,669,151 B2
(45) Date of Patent: Dec. 30, 2003

(54) CABLE TIE MOUNTING BASE

(75) Inventor: Tony Mascadri, Marysville, OH (US)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 48 days.

(21) Appl. No.: 09/779,320

(22) Filed: Feb. 8, 2001

(65) Prior Publication Data

US 2002/0104931 A1 Aug. 8, 2002

(51) Int. Cl.⁷ ............................... F16L 3/08; F16L 3/12
(52) U.S. Cl. ........................ 248/74.3; 248/65; 248/73
(58) Field of Search ...................... 248/74.3, 73, 484, 248/341, 154, 55, 49, 61, 65; 440/101, 106

(56) References Cited

U.S. PATENT DOCUMENTS

| | | | |
|---|---|---|---|
| 1,070,921 A | * 8/1913 | Saltiel | 52/686 |
| 3,454,249 A | 7/1969 | Geisinger | 248/205.3 |
| 3,632,071 A | * 1/1972 | Cameron | 248/74.3 |
| 3,913,876 A | 10/1975 | McSherry | 248/74.3 |
| 4,488,333 A | 12/1984 | Tracy | 24/140 |
| 4,502,653 A | * 3/1985 | Curtis, Jr. | 248/55 |
| D309,250 S | 7/1990 | Flood et al. | D8/356 |
| D316,511 S | 4/1991 | White, Jr. | D8/373 |
| D347,782 S | 6/1994 | Wentzel | D8/356 |
| D376,531 S | 12/1996 | Polley | D8/373 |
| D401,498 S | 11/1998 | Cavency | D8/356 |
| 6,106,189 A | * 8/2000 | Seale | 403/398 |
| D436,522 S | * 1/2001 | Neider et al. | D8/380 |

* cited by examiner

*Primary Examiner*—Gwendolyn Baxter
(74) *Attorney, Agent, or Firm*—Rankin, Hill, Porter & Clark LLP

(57) ABSTRACT

A cable tie mounting base having a plate, a plurality of legs, and a table. The legs space the table from the plate such that a pair of slots are formed between a bottom surface of the table, the top surface of the plate, and the legs. The slots are adapted to receive cable ties to permit lashing of cables to the table. A top surface of the table includes first and second depressions that are aligned with the slots and adapted to at least partially receive cables therein. The plate is adapted for adhesive securement to a support surface, and is continuous and uninterrupted.

8 Claims, 2 Drawing Sheets

CABLE TIE MOUNTING BASE

BACKGROUND OF THE INVENTION

1. Field of the Invention

The present invention generally relates to cable ties and, more particularly, to mounting bases used to secure cable ties to a support surface.

2. Description of Related Art

In many situations, it is necessary or desirable for manufacturing or assembly purposes to secure cables so that they traverse a predetermined course. Many times a cable tie may be used to lash the cable or bundle of cables to a support surface. Other times, conventional fasteners such as clamps can be used to secure cables to the support surface. However, lashing and conventional fasteners are not always suitable. For example, when the cables are to be secured to an inner surface of a body panel of an automobile, motorcycle, personal watercraft, or other vehicle, provision of one or more lashing holes or deformation of the outer body panel is unacceptable. Cable tie mounting bases have been developed to permit attachment of the cables to the body panel in a non-damaging manner.

The mounting base permits cables to be secured at any location along the body panel without providing holes in the body panel. Cable tie mounting bases conventionally include a bottom plate, which is secured to the support surface or body panel, and a raised table-like portion. The table-like portion includes legs that space at least some of the table-like portion from the plate and thereby define either one or two slots between the plate and table. U.S. Pat. Nos. 3,454,249; 3,913,876; 4,488,333; and Des. 376,531 are illustrative of single-slot mounting bases while U.S. Pat. Nos. Des. 309,250; Des. 316,511; Des. 347,782; and Des. 401,498 are exemplary of two-slot mounting bases. With either type of mounting base, a conventional cable tie may be inserted through the slot and used to secure the cable(s) to the mounting base.

Mounting bases having two slots are considered to be more desirable than the single-slot type. Placement of two-slot mounting bases requires less care and precision, as compared to single-slot mounting bases, because either slot is available to the cable tie installer. On the other hand, if only one slot is present, the person installing the base must exercise more care and caution because the cable tie installer will only have the one slot available.

Mounting bases are formed by injection molding. Unfortunately, molding a two-slot mounting base is much more difficult than molding a single-slot mounting base. The injection molds for two-slot mounting bases include a four-sided insert or projection that extends from the bottom of the mold. When the plastic material to be molded is injected, it flows around the projection. When the base is removed from the mold, there is a hole in the bottom of the mounting base or plate due to the projection. Therefore, all of the known two-slot mounting bases have a hole through the plate.

Since the plate is normally secured to a support surface by means of liquid adhesive, the hole in the plate creates a problem. The liquid adhesive tends to flow into the hole and, because the hole is directly under the table portion, the adhesive tends to build up in the area under the table portion. The built-up adhesive may obstruct the slots and, therefore, prevent or complicate insertion of the cable tie therethrough.

Accordingly, there exists a need in the art for a two-slot cable tie mounting base that avoids or minimizes the deficiencies of the known devices. More specifically, there exists a need in the art for a cable tie mounting base having two transverse slots for receipt of a cable tie, wherein problems associated with adhesive build up in the slots are eliminated.

SUMMARY OF THE INVENTION

The present invention is directed toward a cable tie down that reduces or eliminates the deficiencies in the art. The present invention is further directed toward an improved two slot cable tie mounting base that prevents or minimizes adhesive build up within the slots.

In accordance with the present invention, a cable tie mounting base includes a plate, a plurality of legs, and a table. The legs extend from an upper surface of the plate to the table and support the table over the plate upper surface such that first and second slots are defined between the table lower surface, the plate upper surface, and the legs. The table overlies a center portion of the plate generally at an intersection of the first and second slots. The plate is continuous and uninterrupted at least in the center portion.

In further accordance with the present invention, the table upper surface has a first curved depression and a second curved depression. The first curved depression is generally aligned with the first slot and the second curved depression is generally aligned with the second slot. The first and second slots are adapted to receive a cable tie and the first and second curved depressions are adapted to at least partially accommodate a cable to facilitate lashing of the cable to the table with the cable tie. Moreover, the table is wedge-shaped such that first and second sides of the table are at an angle to one another and third and fourth sides of the table are parallel to each other and parallel to one of the first and second slots. The first and second sides of the table are at a non-ninety degree angle to the first and second ends.

In further accordance with the present invention, the plurality of legs comprise first, second, third, and fourth legs. The first and second legs merge with the first or top side of the table adjacent corners thereof and the third and fourth legs merge with the second or bottom side of the table adjacent corners thereof.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

Figure 1:
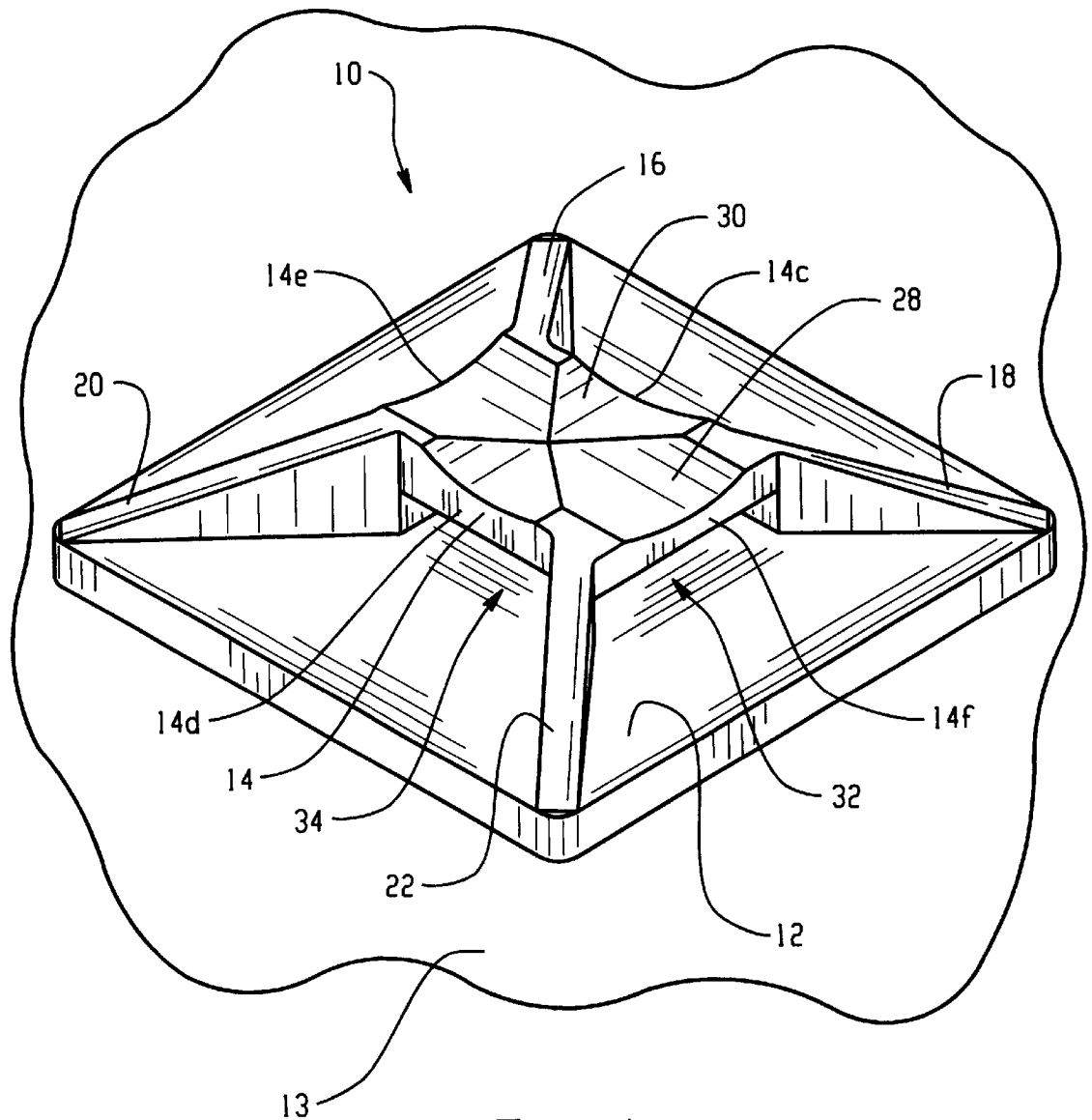
FIG. 1 is a perspective view of the cable tie mounting base according to the present invention.

With reference to the drawing figures, the cable tie mounting base 10 according to the present invention is shown to generally include a plate 12, a table 14, and four legs 16, 18, 20, 22 connecting the plate 12 to the table 14. The plate 12 is generally square in shape and includes an upper surface 12a and a lower surface 12b. The plate lower surface 12b is adapted to be adhesively secured to a support surface 13, such as an inner surface of an automobile body panel. Accordingly, the plate lower surface 12b is preferably generally planar, but may include surface contours or texture (i.e., grooves, dimples, rough surface) to facilitate or encourage adhesive securement. The plate upper surface 12a faces the table 14 and the legs 16, 18, 20, 22 extend upwardly therefrom. The plate 12 defines a first axis 24 and a second axis 26, the first and second axes being perpendicular to each other and intersecting at a center of the plate 12.

The table 14 has a curved upper surface 14a and a generally planar lower surface 14b. The table 14 is generally centered over the plate 12, and the lower surface 14b of the table faces toward the upper surface 12a of the plate. The table has a first or top side 14c, a second or bottom side 14d, a third or left side 14e, and a fourth or right side 14f. Near each corner, the top side 14c or bottom side 14d of the table 14 is secured to an upper end of an associated leg (16, 18 or 20, 22, respectively), as illustrated. The upper surface 14a of the table 14 defines a saddle portion that is generally adapted to receive cables and, for that purpose, defines first and second depressions 28, 30.

The first and second depressions 28, 30 are relatively perpendicular to one another and are slightly interrupted or discontinuous at an area of intersection. The first depression 28 is aligned with the first plate axis 24 and the second depression 30 is aligned with the second plate axis 26. The first and second depressions 28, 30 preferably have the same depth, but slightly different diameters, which accounts for the slight discontinuity at the intersection area.

Figure 2:
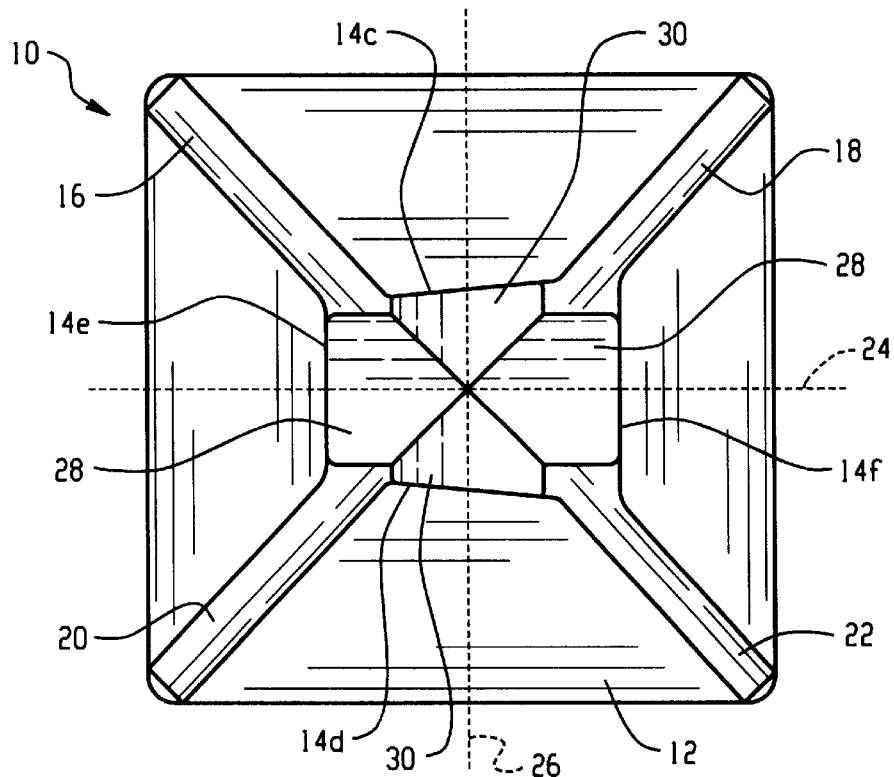
FIG. 2 is a top plan view thereof.
Figure 3:
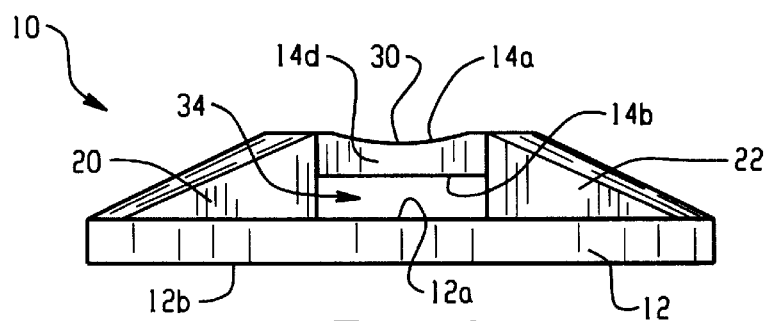
FIG. 3 is a front elevational view thereof.

The table 14 is not rectangular, but rather is wedge-shaped or frusto-triangular in shape. As such, the right side 14f and left side 14e of the table 14, as seen in FIG. 2, are generally parallel to one another, parallel to the second first plate axis 26 and perpendicular to the first plate axis 24. The top side 14c and bottom side 14d, as seen in FIG. 2, are each at an acute angle to the first plate axis 24, preferably at least about 5° and most preferably 5°, and are thus angled toward one another as one moves from the right to the left in FIG. 2. Accordingly, the left side 14e of the table 14 has a length dimension that is relatively less than a length dimension of the right side 14f of the table 14.

The legs 16, 18, 20, 22 extend between the plate upper surface 12a and the table 14 such that the table 14 is raised above the plate 12, as illustrated. More specifically, each of the legs 16, 18, 20, 22 extend from one of the plate corners to an area on the top/bottom side 14c, 14d of the table 14 adjacent one of the table corners such that first and second slots 32, 34 are formed between the table bottom surface 14b, the plate upper surface 12a, and the legs 16, 18, 20, 22. Even more specifically, the first leg 16 merges with the top side 14c of the table 14 adjacent the corner between the top side 14c and the left side 14e. The second leg 18 merges with the top side 14c of the table 14 adjacent the corner between the top side 14c and the right side 14f. Similarly, the third leg 20 merges with the bottom side 14d of the table 14 adjacent the corner between the bottom side 14d and the left side 14e, and the fourth leg 22 merges with the bottom side 14d of the table 14 adjacent the corner between the bottom side 14d and the right side 14f.

With the exemplary and preferred embodiment shown in the drawing figures, the plate 12 is generally square in shape and the legs 16, 18, 20, 22 extend essentially diagonally from each of the four corners of the plate toward the middle or center of the plate. More specifically, and as will be apparent to one skilled in the art from the discussion to follow, each of the legs 16, 18, 20, 22 are at a slight angle to the diagonal. The slots 32, 34, on the other hand, extend along the axes 24, 26 of the plate 12 and transverse to one another. More specifically, and with reference to FIG. 2, the first slot 32 extends under the table from left to right in alignment with the first axis 24 and the first depression 28, whereas the second slot 34 extends from top to bottom in alignment with the second axis 26 and the second depression 30.

Figure 4:
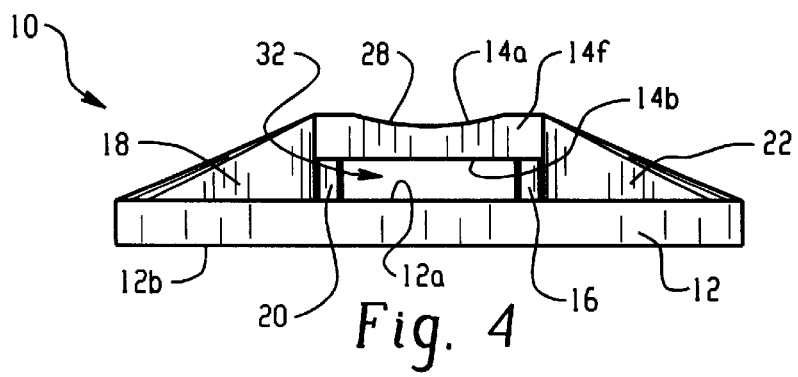
FIG. 4 is a right-side elevational view thereof.

As shown in the drawings and, specifically, FIG. 4, the second slot is generally bigger at the right side 14f of the table than it is at the left side 14e of the table 14. It is noted that the minimum width of the slots 32, 34 must be selected so as to comfortably and slidably receive a cable tie therein. Naturally, it is considered apparent that the specific structural features described hereinbefore and illustrated in the drawings are exemplary in nature, and that the present invention is not limited thereto. Rather, it is contemplated that the shape of the plate and table, and the orientation of the legs relative to the table and/or plate, may be changed or altered to match the environment in which the mounting base is used. Also, although the portions of the mounting base are described separately herein, it is considered apparent that they are integrally formed portions of the same part, and define a single unitary structure.

The structural features of the mounting base described hereinbefore and illustrated in the drawings are important, on the one hand, to permit securement of a cable tie thereto and, on the other hand, to facilitate injection molding of the mounting base. During the molding process, on order to form the base without a central hole in the plate, a slide is used instead of an insert. The slide is tapered to allow simplified removal of the part from the mold following the molding process.

As noted hereinbefore, the legs are located such that they only touch the top and bottom sides of the table to facilitate formation of the second slot. It is noted in this regard that, if the legs merged with the table at the corners, it would be necessary to have a retractable portion to properly make the two side slots. Such a configuration would be extremely expensive and economically impractical. However, with the legs aligned as noted hereinbefore, when a slide is used no insert need be placed in the mold. Accordingly, the plate of the present invention is create in a solid sheet with no holes or recesses.

The present invention has been described herein with particularity, and it is noted that the scope of the invention is not limited thereto. Rather, the present invention is considered to be possible of numerous modifications, alterations, and combinations of parts and, therefore, is only defined by the claims appended hereto.

What is claimed is:

1. A cable tie mounting base, comprising a plate, a plurality of legs, and a table, said plate having an upper surface and a lower surface, said table being wedge-shaped and having an upper surface and a lower surface, said table lower surface facing said upper surface of said plate, said legs extending from the upper surface of said plate to the table and supporting said table over said plate upper surface such that first and second slots are defined in a space delimited by said table lower surface, said plate upper surface, and said legs, wherein said plate defines a first axis and a second axis that extend generally perpendicular to one another and intersect at a center of said plate, and wherein said table overlies the center portion of said plate generally at an intersection of said first and second slots, and at least said center portion of said plate is continuous and uninterrupted, wherein said first slot extends parallel to said first axis and said second slot extends parallel to said second axis, wherein said table upper surface has a first curved depression and a second curved depression, said first curved depression being generally aligned with said first slot and said second curved depression being generally aligned with said second slot, and wherein first and second sides of the table are at an angle to one another and third and fourth sides of the table are parallel to each other and parallel to one of said first and second slots, said first and second sides of the table being at a non-ninety degree angle to said first and second ends.

2. The cable tie mounting base according to claim 1, wherein said plurality of legs comprise first, second, third, and fourth legs, said first and second legs merging with said first side of said table and said third and fourth legs merging with said second side of said table.

3. The cable tie mounting base according to claim 2, wherein said first and second slots are adapted to receive a cable tie and said first and second curved depressions are adapted to at least partially accommodate a cable to facilitate lashing of said cable to said table with said cable tie.

4. A cable tie mounting base, comprising a plate, a plurality of legs and a table, said plate having an upper surface and a lower surface, said table being wedge-shaped and having an upper surface and a lower surface, said table lower surface facing said upper surface of said plate, said legs extending from the upper surface of said plate to the table and supporting said table over said plate upper surface such that first and second slots are defined in a space delimited by said table lower surface, said plate upper surface, and said legs, wherein said plate defines a first axis and a second axis that extend generally perpendicular to one another and intersect at a center of said plate, and wherein said table overlies the center portion of said plate generally at an intersection of said first and second slots, and at least said center portion of said plate is continuous and uninterrupted, wherein said first slot extends parallel to said first axis and said second slot extends parallel to said second axis, said plate lower surface being adapted to be secured to a support surface that is provided by a vehicle, and said plate lower surface is adhesively secured to said support surface, and wherein said table upper surface has a first curved depression and a second curved depression, said first curved depression being generally aligned with said first slot and said second curved depression being generally aligned with said second slot, and wherein first and second sides of the table are at an angle to one another and third and fourth sides of the table are parallel to each other and parallel to one of said first and second slots, said first and second sides of the table being at a non-ninety degree angle to said first and second ends.

5. The cable tie mounting base according to claim 4, wherein said plurality of legs comprise first, second, third, and fourth legs, said first and second legs merging with said first side of said table and said third and fourth legs merging with said second side of said table.

6. The cable tie mounting base according to claim 5, wherein said first and second slots are adapted to receive a cable tie and said first and second curved depressions are adapted to at least partially accommodate a cable to facilitate lashing of said cable to said table with said cable tie.

7. A cable tie mounting base, comprising a plate, a plurality of legs, and a table, said plate having an upper surface and a lower surface, said table having an upper surface and a lower surface, said table lower surface facing said upper surface of said plate, said legs extending from the upper surface of said plate to the table and supporting said table over said plate upper surface such that first and second slots are defined in a space delimited by said table lower surface, said plate upper surface, and said legs, wherein said plate defines a first axis and a second axis that extend generally perpendicular to one another and intersect at a center of said plate, and wherein said table overlies the center portion of said plate generally at an intersection of said first and second slots, and at least said center portion of said plate is continuous and uninterrupted, wherein said first slot extends parallel to said first axis and said second slot extends parallel to said second axis, wherein said table upper surface has a first curved depression and a second curved depression, said first curved depression being generally aligned with said first slot and said second curved depression being generally aligned with said second slot, and said first and second depressions are relatively perpendicular to one another and are discontinuous at an area of intersection, wherein at least one of said first and second slots has a first end that is relatively larger than a second end thereof.

8. The cable tie mounting base according to claim 7, wherein said first and second depressions are relatively perpendicular to one another and are discontinuous at an area of intersection.

* * * * *

UNITED STATES PATENT AND TRADEMARK OFFICE
CERTIFICATE OF CORRECTION

PATENT NO. : 6,669,151 B2  
DATED : December 30, 2003  
INVENTOR(S) : Mascadri

It is certified that error appears in the above-identified patent and that said Letters Patent is hereby corrected as shown below:

<u>Title page</u>,  
Item [75], Inventor, delete "Tony" and insert -- Anthony --.  
Item [56], References Cited, U.S. PATENT DOCUMENTS, second reference, delete "7/1969" and insert -- 8/1967 --.

Signed and Sealed this

Twenty-seventh Day of April, 2004

JON W. DUDAS  
*Acting Director of the United States Patent and Trademark Office*